(12) United States Patent
Lai

(10) Patent No.: US 10,586,013 B2
(45) Date of Patent: Mar. 10, 2020

(54) CALIBRATION OF DIRECTED SELF-ASSEMBLY MODELS USING PROGRAMMED DEFECTS OF VARYING TOPOLOGY

(71) Applicant: International Business Machines Corporation, Armonk, NY (US)

(72) Inventor: Kafai Lai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 15/883,892

(22) Filed: Jan. 30, 2018

(65) Prior Publication Data

US 2019/0236237 A1 Aug. 1, 2019

(51) Int. Cl.
G06F 17/50 (2006.01)
H01L 21/027 (2006.01)
G06F 17/13 (2006.01)

(52) U.S. Cl.
CPC .......... *G06F 17/5081* (2013.01); *G06F 17/13* (2013.01); *G06F 17/5009* (2013.01); *H01L 21/0271* (2013.01); *G06F 2217/02* (2013.01); *G06F 2217/06* (2013.01); *G06F 2217/08* (2013.01)

(58) Field of Classification Search
CPC .. G06F 17/13; G06F 17/5009; G06F 17/5081; H01L 21/0271
USPC .............................. 716/51, 52, 55
See application file for complete search history.

(56) References Cited

U.S. PATENT DOCUMENTS

| 7,488,933 | B2 | 2/2009 | Ye et al. | |
|---|---|---|---|---|
| 8,669,645 | B2 * | 3/2014 | Millward et al. | B82Y 10/00 257/638 |
| 8,856,693 | B2 | 10/2014 | Cheng et al. | |

(Continued)

FOREIGN PATENT DOCUMENTS

WO 2015018590 A1 2/2015

OTHER PUBLICATIONS

K. Yoshimoto et al., "Large-Scale Dynamics of Directed Self-Assembly Defects on Chemically Pre-Patterned Surface," Proceedings of SPIE, Mar. 2013, 9 pages, vol. 8680.

(Continued)

*Primary Examiner* — Sun J Lin
(74) *Attorney, Agent, or Firm* — Vazken Alexanian; Ryan, Mason & Lewis, LLP

(57) ABSTRACT

Techniques are provided for calibrating physical directed self-assembly (DSA) models. For example, an experimental DSA process is performed using a block copolymer (BCP) material and a DSA guiding pattern with a predefined defect formed as part of the DSA guiding pattern. A difference in size (e.g., shrinkage) is determined between a size of the predefined defect of the DSA guiding pattern and a remaining size of a morphological defect in the BCP material as assembled at a completion of the experimental DSA process. The difference in size is utilized as calibration data in a DSA simulation system to calibrate a simulated physical DSA model which defines a simulated DSA process that corresponds to the experimental DSA process. The simulated physical DSA model defines a simulated guiding pattern with a programmed defect, which corresponds to the DSA guiding pattern and the predefined defect.

22 Claims, 8 Drawing Sheets

(56) References Cited

U.S. PATENT DOCUMENTS

| | | | |
|---|---|---|---|
| 9,111,067 B2 | 8/2015 | Robles | |
| 9,230,820 B2* | 1/2016 | Ruiz et al. | H01L 21/3086 |
| 9,330,228 B2* | 5/2016 | Robles et al. | G06F 17/5081 |
| 9,431,219 B1* | 8/2016 | Cushen et al. | G11B 5/855 |
| 9,563,122 B2* | 2/2017 | Cheng et al. | G03F 7/40 |
| 9,632,408 B1* | 4/2017 | Cottle et al. | H01L 21/302 |
| 9,652,581 B2* | 5/2017 | Pikus et al. | G06F 17/5072 |
| 9,768,059 B1* | 9/2017 | Liu et al. | H01L 21/31144 |
| 2016/0178999 A1 | 6/2016 | Wuister et al. | |
| 2016/0350465 A1 | 12/2016 | Guillorn et al. | |
| 2016/0379837 A1* | 12/2016 | Cheng et al. | C09D 201/00 438/781 |

OTHER PUBLICATIONS

T. Fühner et al., "An Integrated Source/Mask/DSA Optimization Approach," Proceedings of SPIE, Mar. 2016, 12 pages, vol. 9780.

Y. Hori et al., "Multiscale DSA Simulations for Efficient Hotspot Analysis," Proceedings of SPIE, Mar. 2014, 8 pages, vol. 9049.

B. Meliorisz et al., "Modeling and Parameter Tuning for Templated Directed Self-Assembly," Proceedings of SPIE, Mar. 2016, 7 pages, vol. 9777.

G.S. Doerk et al., "Enabling Complex Nanoscale Pattern Customization Using Directed Self-Assembly," Nature Communications, Dec. 2014, 8 pages, vol. 5.

K. Lai et al., "Advanced Fast 3D DSA Model Development and Calibration for Design Technology Co-Optimization," Proceedings of SPIE, Apr. 2017, 16 pages, vol. 10144.

B. Meliorisz et al., "Simulation of Defect Formation in DSA Process," DSA Symposium, Oct. 2016, 1 page.

* cited by examiner

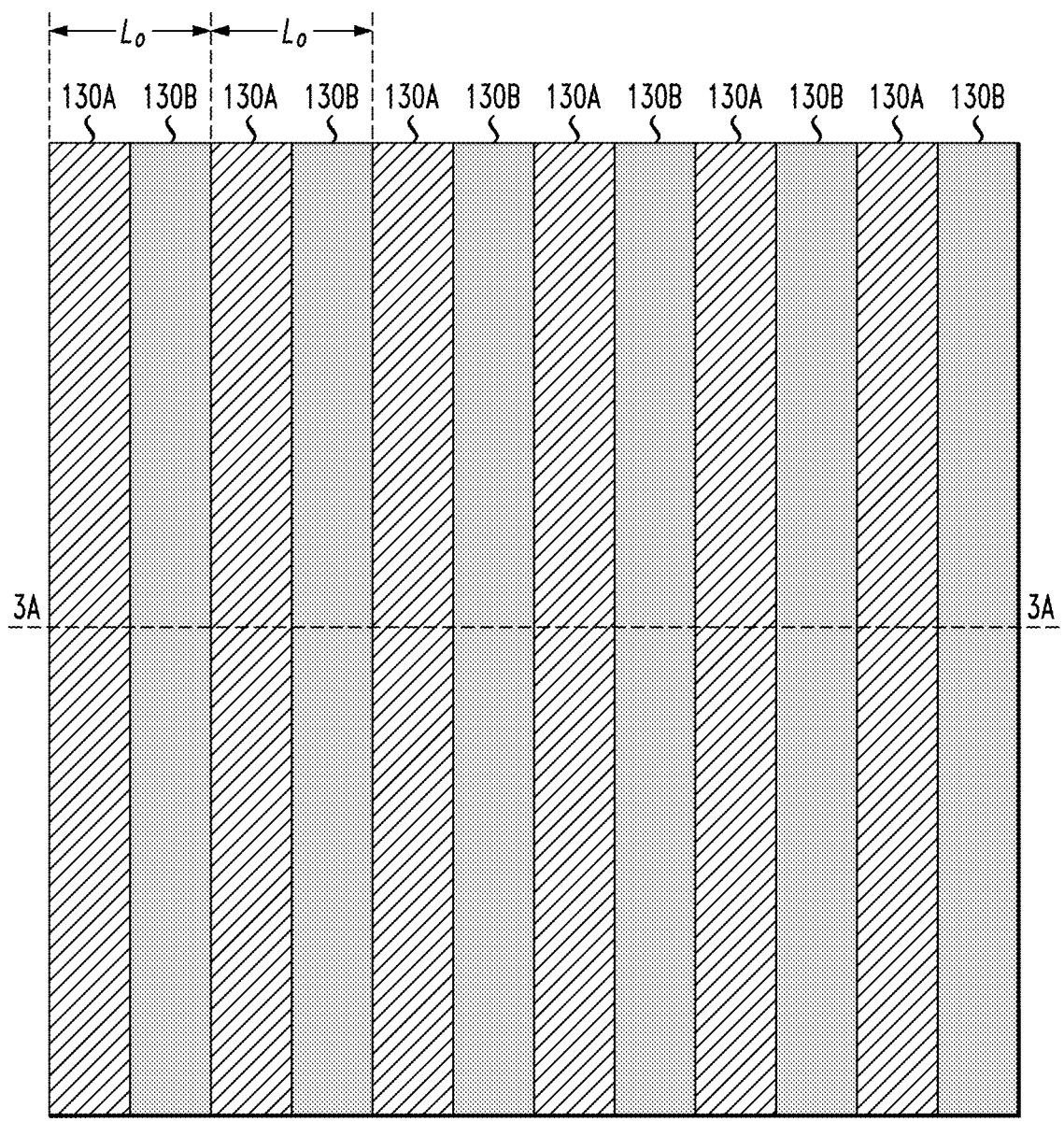

CALIBRATION OF DIRECTED SELF-ASSEMBLY MODELS USING PROGRAMMED DEFECTS OF VARYING TOPOLOGY

TECHNICAL FIELD

The present disclosure generally relates to computer-aided semiconductor design techniques and, in particular, techniques for calibrating physical models for computer simulation of directed self-assembly (DSA) patterning systems.

BACKGROUND

DSA is a fabrication approach that uses the self-assembly properties of block copolymer materials to form patterning structures for use in semiconductor device fabrication. The DSA of block copolymers is a promising technology to extend patterning resolution for next generation technology nodes, e.g., 10 nm and beyond. In general, DSA is based on the phase separation of block copolymers to generate, e.g., dense grating structures with nanoscale feature sizes and pitches. The grating structures comprise lamellar structures composed of alternating layers of different materials in the form of lamellae. The phase separation of block copolymer material can be facilitated by the use of chemically and/or physically pre-patterned guiding structures. One of the major challenges for the use of DSA as a viable lithography solution is the ability to implement defect-free DSA processes. The morphological defects of block copolymer materials are dynamically formed during an annealing process which is implemented to cause phase separation and self-assembly of the constituent block copolymer materials to form a target DSA structure. Understanding the dynamics of such defects is therefore useful in order to manufacture defect-free wafers.

In this regard, various computer simulation techniques have been implemented to predict phase-separated morphologies of block copolymers on chemically and physically pre-patterned guiding surfaces and structures. However, many conventional DSA simulation techniques are computationally expensive and/or not sufficiently accurate for large-scale DSA simulations. For example, many physical models for DSA require accurate calibration of model parameters from actual wafer data to make an accurate prediction. Most of the calibration is based on morphology data at a single process condition but this will sacrifice model accuracy. In addition, some DSA modeling techniques enhance the calibration steps by using kinetic data (time stepping) for more accurate modeling of the process parameters, but such modeling is computationally complex as it requires solving the DSA model equations dynamically (via partial differential equations) by finite difference (or element) time domain to generate the intermediate time stepping simulation data. The kinetic data comprises information regarding, e.g., the formation of DSA defects as a function of anneal time. Typically, the time-domain based DSA models utilize a stochastic noise term in the equation to help convergence since without noise, free energy always decreases with time with the risk of being trapped in a metastable state. Typically, these conventional time-domain based approaches have various disadvantages including, but not limited to, slow convergence, long computation times, unstable for large values of certain parameters in the applied solution, sensitive to initial random state and noise, etc.

SUMMARY

Embodiments of the invention include systems and methods for calibrating physical DSA models using programmed defects of varying topology. For example, in one embodiment, a computer simulated method comprises: receiving as input, calibration data from an experimental directed self-assembly (DSA) process which is performed using a block copolymer (BCP) material and a DSA guiding pattern with a predefined defect formed as part of the guiding pattern, wherein the calibration data comprises information regarding an experimental difference in size between the predefined defect of the guiding pattern, and a remaining size of a morphological defect in the BCP material as assembled at a completion of the DSA process; generating a simulated physical DSA model with initial model parameters, wherein the simulated physical DSA model defines a simulated DSA process which corresponds to the experimental DSA process, and wherein the simulated physical DSA model comprises a simulated guiding pattern with a programmed defect, which corresponds to the experimental guiding pattern and the predefined defect; performing an optimization process of the simulated physical DSA model using the initial model parameters; determining a simulated difference in size between the programmed defect of the simulated guiding pattern and a remaining size of a simulated morphological defect which results from the optimization process of the simulated physical DSA model; comparing the experimental difference and the simulated difference to determine a comparison value; and determining that the simulated physical DSA model is calibrated in response to the comparison value being within a predefined tolerance threshold.

Another embodiment includes a method comprising: performing an experimental DSA process using a block copolymer (BCP) material and a DSA guiding pattern with a predefined defect formed as part of the guiding pattern; determining an experimental difference in size between the predefined defect of the guiding pattern, and a remaining size of a morphological defect in the BCP material as assembled at a completion of the DSA process; and utilizing the experimental difference as calibration data in a DSA simulation system to calibrate a simulated physical DSA model which defines a simulated DSA process that corresponds to the experimental DSA process, wherein the simulated physical DSA model comprises a simulated guiding pattern with a programmed defect, which corresponds to the experimental guiding pattern and the predefined defect.

Other embodiments will be described in the following detailed description of embodiments, which is to be read in conjunction with the accompanying figures.

BRIEF DESCRIPTION OF THE DRAWINGS

FIGS. 1A through 3B schematically illustrate an example DSA process which can be physically modeled using computer simulation techniques according to embodiments of the invention, wherein:

FIGS. 1A and 1B schematically illustrate a semiconductor device at an intermediate stage of fabrication, which comprises a substrate and a guiding pattern formed on the substrate surface;

FIG. 2 is schematic cross-sectional side view of the semiconductor structure of FIGS. 1A and 1B after depositing a layer of block copolymer material to cover the guiding pattern; and FIGS. 3A and 3B are schematic views of the semiconductor structure shown in FIG. 2 after thermally annealing the block copolymer layer to segregate and self-assemble first and second block materials of the block copolymer layer into a block copolymer pattern.

DETAILED DESCRIPTION

Figure 1A:
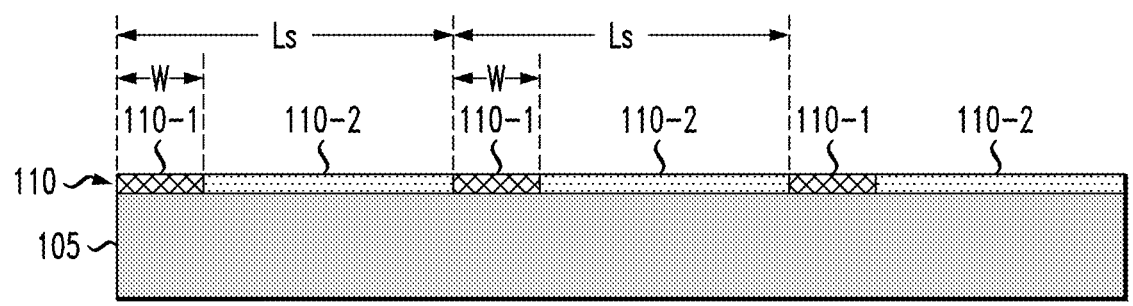

Embodiments of the invention will now be described in further detail with regard to systems and methods for calibrating physical DSA models using programmed defects of varying topology. Embodiments of invention as discussed in further detail below are configured to obtain experimental data of DSA processes which are performed using predefined defects formed as part of a guiding pattern, and utilize the experimental data to calibrate physical DSA models. A difference in size (e.g., shrinkage) is determined between a size of the predefined defect of the guiding pattern and a remaining size of a morphological defect in the BCP material as assembled at a completion of the DSA process. The experimental size difference is utilized as calibration data in a DSA simulation system to calibrate a simulated physical DSA model which comprises model parameters that define a simulated DSA process which corresponds to the experimental DSA process. The simulated physical DSA model defines a simulated guiding pattern with a programmed defect, which corresponds to the experimental guiding pattern and the predefined defect. An optimization process is performed using the simulated physical DSA model and a simulated difference in size is determined between the programmed defect of the simulated guiding pattern and a remaining size of a simulated morphological defect which results from the optimization process of the simulated physical DSA model. The simulated size difference is compared to the experimental size difference (calibration data), and the simulated physical DSA model is deemed calibrated when the comparison result falls within a predefined tolerance threshold.

In one example embodiment, the experimental guiding pattern and the corresponding simulated guiding pattern comprise a chemical guiding pattern with pinning regions and neutral regions, wherein the predefined defect and the corresponding programmed defect comprise pinning regions in the experimental and simulated guiding patterns.

The predefined defect and the corresponding programmed defect may comprise shapes of different sizes, aspect rations, orientations, etc. For example, the predefined defect and the corresponding programmed defect may comprise a plurality of rectangular-shaped defects with a same area but different aspect ratios, or a plurality of circular-shaped defects with different radii, or a plurality of square-shaped defects with different areas, etc.

It is to be understood that the various layers, structures, and regions shown in the accompanying drawings are schematic illustrations that are not drawn to scale. In addition, for ease of explanation, one or more layers, structures, and regions of a type commonly used to form semiconductor devices or structures may not be explicitly shown in a given drawing. This does not imply that any layers, structures, and regions not explicitly shown are omitted from the actual semiconductor structures. Furthermore, it is to be understood that the embodiments discussed herein are not limited to the particular materials, features, and processing steps shown and described herein. In particular, with respect to semiconductor processing steps, it is to be emphasized that the descriptions provided herein are not intended to encompass all of the processing steps that may be required to form a functional semiconductor integrated circuit device. Rather, certain processing steps that are commonly used in forming semiconductor devices, such as, for example, wet cleaning and annealing steps, are purposefully not described herein for economy of description.

Moreover, the same or similar reference numbers are used throughout the drawings to denote the same or similar features, elements, or structures, and thus, a detailed explanation of the same or similar features, elements, or structures will not be repeated for each of the drawings. It is to be understood that the terms "about" or "substantially" as used herein with regard to thicknesses, widths, percentages, ranges, etc., are meant to denote being close or approximate to, but not exactly. For example, the term "about" or "substantially" as used herein implies that a small margin of error is present, such as 1% or less than the stated amount.

To provide spatial context to the different structural orientations of the semiconductor structures shown throughout the drawings, XYZ Cartesian coordinates are shown in each of the drawings. It is to be understood that the terms "vertical" or "vertical direction" as used herein denotes a Z-direction of the Cartesian coordinates shown in the drawings, and that the terms "horizontal" or "horizontal direction" as used herein denotes an X-direction and/or Y-direction of the Cartesian coordinates shown in the drawings, which is perpendicular to the Z-direction.

FIGS. 1A through 3B schematically illustrate an example DSA process which can be physically modeled using computer simulation techniques according to embodiments of the invention. In particular, FIGS. 1A and 1B schematically illustrate a semiconductor device 100 at an intermediate stage of fabrication, which comprises a substrate 105 and a guiding pattern 110 formed on a surface of the substrate 105. FIG. 1B is a schematic top plan view of the semiconductor device 100, and FIG. 1A is a schematic cross-sectional side view of the semiconductor device 100 along line 1A-1A of FIG. 1B. The guiding pattern 110 is structurally configured and dimensioned to allow the self-assembly of block copolymer structures for a self-aligned patterning process as discussed below. In one embodiment, as shown in FIGS. 1A and 1B, the guiding pattern 110 comprises a chemical guiding pattern that is utilized for a chemo-epitaxy DSA process. The chemical guiding pattern 110 comprises a pattern of thin films including pinning layers 110-1 and neutral layers 110-2, which are formed as parallel stripes on the surface of the substrate 105. The pinning layers 110-1 are formed of a material which has an affinity to one block copolymer material of a multi-block copolymer material (e.g., di-block copolymer material) that is used for the DSA process. The neutral layers 110-2 (or non-pinning layers) are formed of a material that no affinity, or substantially no affinity, to any of the constituent block copolymer materials of the block copolymer material used for the DSA process.

The guiding pattern 110 provides a pattern of lines and spaces (L/S), wherein the pinning layers 110-1 correspond to the lines and the neutral layers 110-2 represent the spaces between the lines. In the example embodiment, the chemical guiding pattern 110 is configured to direct the self-assembly of a symmetric, lamella-forming AB diblock copolymer on top of the chemical (L/S) guiding pattern 110. The geometry of the diblock copolymer is defined by the dimensions of the guiding pattern pitch (Ls) and the width (W) of the pinning layers 110-1. For increased resolution via feature density multiplication, the pitch Ls of the guiding pattern 110 is selected to be a multiple of the natural pitch Lo of the BCP. For example, Ls can be 2×, 3× or 4× the natural pitch Lo. In addition, the width W of the pinning layers 110-1 is typically selected to be ½ Lo. The guiding pattern 110 is formed using known materials and known techniques.

When the pitch Ls of the guiding pattern 110 coincides with the natural pitch Lo of the lamellar structure of the block copolymers in the bulk diblock copolymer material, and if both block copolymers have a similar affinity to the free surface of the neutral layers 110-2 the copolymer will form symmetric standing lamellae orientated perpendicular to the surface of the guiding pattern 110. When the pitch Ls of the guiding pattern 110 is a small multiple of the bulk lamellar structure of the diblock copolymer, the copolymer structure will "fill-in" the missing lines and multiply the density of the guiding pattern to fabricate a diblock pattern with a periodicity of a few tens of nanometers. In the example embodiment of FIGS. 1A and 1B, the pitch Ls of the guiding pattern 110 is 2Lo, and the width W of the pinning layers 110-1 is 0.5Lo.

Figure 1B:
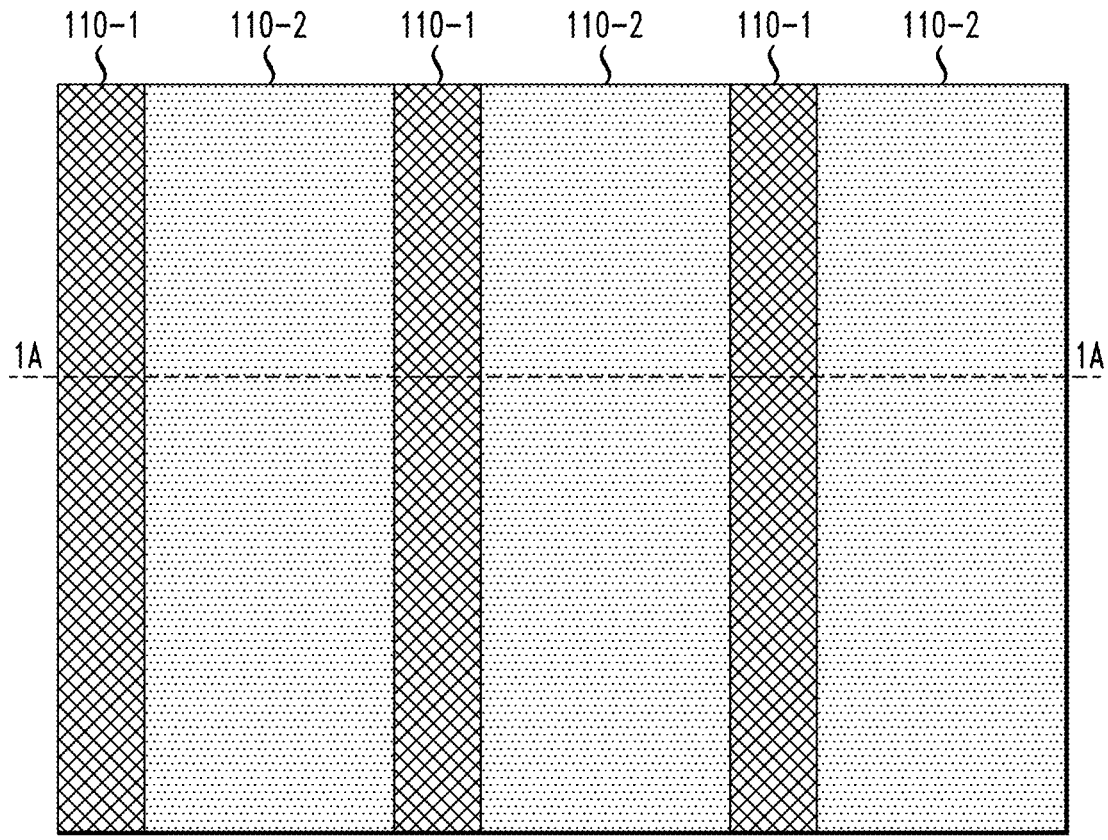
Figure 2:
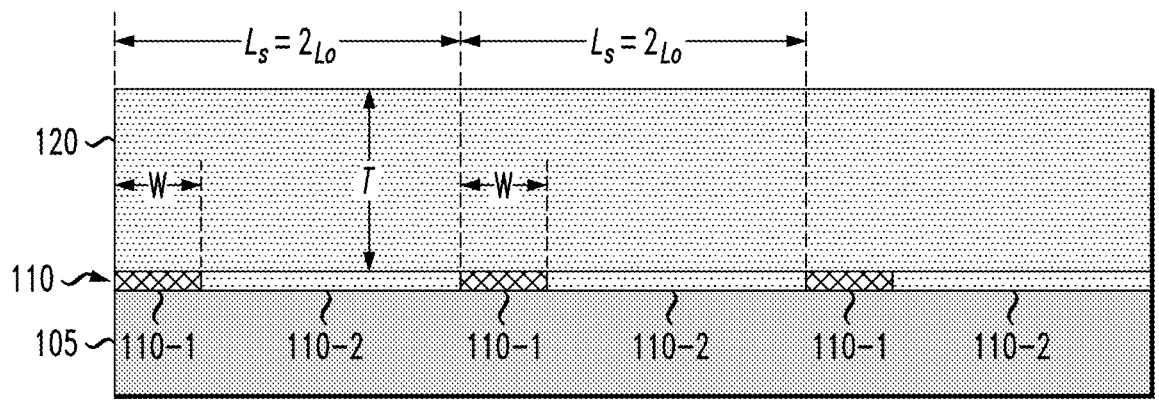

FIG. 2 is schematic cross-sectional side view of the semiconductor structure of FIGS. 1A and 1B after depositing a layer of block copolymer material 120 to cover the guiding pattern 110. As is known in the art, block copolymers are a class of polymers having two or more polymer chains (or blocks) that are chemically bound to each other. In one embodiment, the layer of block copolymer material 120 (or block copolymer layer 120) comprises an engineered mixture of different block materials (e.g., polymerized monomers) which, when subjected to a thermal anneal process, will phase-separate at the molecular level, and then self-organize and assemble into a two-tone AB block pattern comprising two different block copolymers that have etch selectivity with respect to each other.

For example, in one embodiment, the layer of block copolymer material 120 can include a first block material comprising trimethylsilane (TMS) or trimethylsilyl hydride, which has a compound formula of $C_3H_{10}Si$ (or structural formula $(CH_3)_3SiH$), and a second block material comprising Poly(methyl methacrylate) (PMMA). The block materials may include other types of block copolymer materials such as polystyrene or propyltrimethoxysilane (PTMS), etc. As shown in FIG. 2, the layer of block copolymer material 120 is formed with a thickness T, which in one embodiment is the same or similar to the natural pitch Lo of the block copolymer material 120.

Figure 3A:
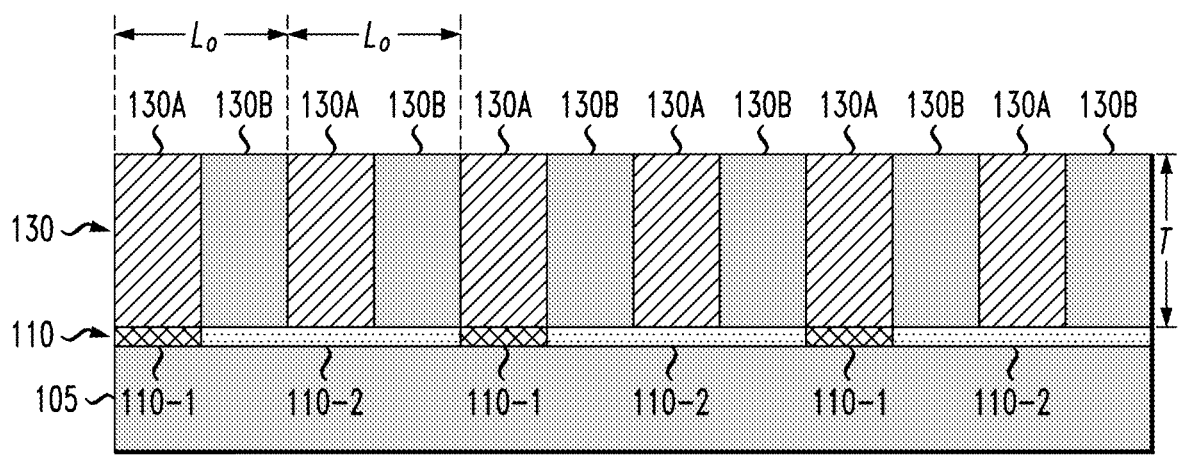

FIGS. 3A and 3B are schematic views of the semiconductor device shown in FIG. 2 after thermally annealing the diblock copolymer layer 120 to segregate and self-assemble first and second block materials of the block copolymer layer into a block copolymer pattern 130. FIG. 3B is a schematic top plan view of the semiconductor device, and FIG. 3A is a schematic cross-sectional side view of the semiconductor device along line 3A-3A of FIG. 3B. As shown in FIGS. 3A and 3B, the block copolymer pattern 130 comprises a first block material 130A and a second block material 130B, wherein the first block material 130A has an affinity to the pinning layers 110-1. In the example embodiment shown in FIGS. 3A and 3B, the first and second block materials 130A and 130B are configured to microphase-separate and self-assemble into a repeating two-tone AB pattern, which has natural block copolymer pitch Lo. The pinning layers 110-1 provide an affine surface (e.g., wetting surface) for the first block material 130A such that the first block material 130A self-assembles on top of the pinning layers 110-1.

The block copolymer layer 120 can be deposited (in FIG. 2) using any suitable deposition process such as spin-on coating, dip-coating, drop-coating, etc. A thermal annealing process is then performed at a temperature in a range of about 150° C. to about 200° C. and for a period of time, which is sufficient for the constituent block components of the block copolymer layer 120 to phase-separate and assemble into periodic blocks (i.e., into separate domains). As is understood by those of ordinary skill in the art, the specific characteristics and equilibrium morphologies of the resulting block copolymer pattern 130 that is formed, is based on various factors including, but not limited to, the molecular characteristics of the constituent block components of the block copolymer layer 120, the thickness T of the block copolymer layer 120, the relative proportion of the different block materials in the engineered multi-block copolymer mixture 120, the surface energies and molecular interaction between the different copolymer block materials and the materials that form the guiding pattern 110, etc.

Furthermore, it is understood that the constituent copolymer blocks can only phase-separate to a distance which is commensurate with the chain sizes of the copolymer blocks. In this regard, the commensurability between the width W and pitch Ls of the pinning layers 110-1 of the guiding pattern 110 and the spacing (neutral layers 110-2) the natural pitch Lo of the copolymer block chains is an important fact that is taken into considerations so that the guiding pattern 110 can facilitate otherwise induce a high degree of positional and orientational order in the self-assembled, nanoscale block patterns.

In the example embodiments discussed herein, to facilitate the phase separation and self-assembly of the different blocks which occurs during the thermal anneal process, the first block material 130A is designed to have a block length that is at least substantially the same as the width W of the pinning layers 110-1 of the guiding pattern 110, and the second block material 130B is designed to have a block length that is the same or at least substantially the same as the first block material 130A. The dimensions of the guiding pattern 110 places physical constraints on the block formation such that the resolution of the self-assembled, nanoscale patterns is not too important and there can be some minimal degree of non-commensurability between the guiding feature spacing and the natural pitch and domain sizes of the copolymer blocks, as the guiding pattern 110 would induce some degree of positional and orientational order on the pitch and domain sizes of the copolymer blocks that organize and self-assemble during the thermal anneal process.

As shown in FIGS. 3A and 3B, the block copolymer pattern 130 comprises first and second block materials 130A and 130B (or BCP domains) which comprise a perpendicular orientation with respect to the substrate surface, and which form a repeating AB line pattern (or grating pattern) comprising substantially equal width A and B line features with pitch Lo. One of the block materials 130A and 130B can be selectively etched away to form an etch mask with self-aligned openings, which is used to pattern an underlying layer of the substrate 105, as is understood by one of ordinary skill in the art. The underlying layer of the substrate 105 may comprise a hard mask layer or insulating layer (e.g., interlayer dielectric layer) which is to be patterned using the block copolymer pattern 130.

While FIGS. 3A and 3B schematically illustrate an ideal diblock pattern 130 comprising a grating pattern with straight lines of equal width, in practice, during the thermal annealing step of the DSA process, morphological defects of the block copolymers can be dynamically formed for various reasons. For example, incommensurability between the pitch Ls of the pinning layers 110-1 and the natural pitch Lo of the BCP material causes the BCP chains to stretch or compress to accommodate to the pitch of the guiding patterns, which effectively increases the free energy of the system, and can result in the formation of defects. Moreover, defects can arise based on certain properties and dimensions of the engineered BCP material, such as improper mixtures, insufficient thickness, etc., which may be result in the formation of defects. In addition, localized structural defects in the guiding pattern can result in localized defects in the resulting BCP pattern, which deviate from the ideal block pattern. Such defects can cause broken lines, spaces, bridges, dislocations, disclinations, etc., in the DSA block pattern. Therefore, understanding the dynamics of DSA defects is useful in order to manufacture defect-free wafers. In this regard, embodiments of invention as discussed in further detail below are configured to obtain experimental data of DSA processes that are performed using predefined defects formed as part of a guiding pattern, and utilize the experimental data to calibrate physical DSA models.

Figure 4:
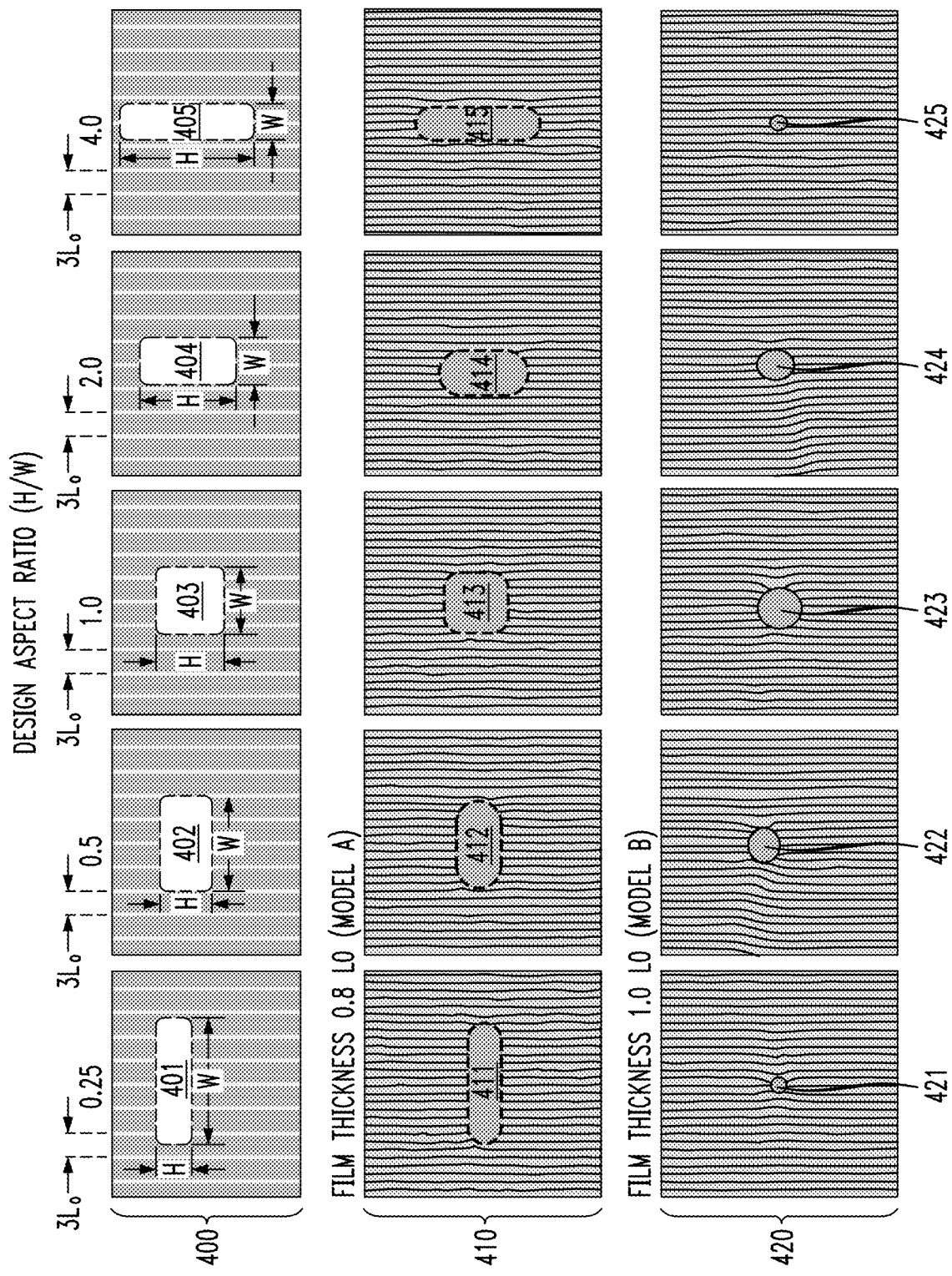
FIG. 4 illustrates experimental DSA processes performed using predefined defects formed as part of a guiding pattern to obtain calibration data which is utilized to calibrate physical DSA models, according to an embodiment of the invention.

For example, FIG. 4 illustrates experimental DSA processes performed using predefined defects formed as part of a guiding pattern to obtain calibration data which is utilized to calibrate physical DSA models, according to an embodiment of the invention. In particular, FIG. 4 comprises SEM (scanning electron microscope) images that show a plurality of regions 400 of a test wafer having a chemical guiding pattern comprising a grating of pinning layers (represented by white stripes) and neutral layers (represented by gray regions) between the pinning layers. The pinning layers (white stripes) are formed with a pitch of 3Lo, which is three times the natural pitch of the diblock material used for experimental DSA processes shown in blocks 410 and 420, and have a width that is about 0.5Lo.

In addition, the chemical guiding pattern shown in regions 400 comprises a plurality of predefined rectangular-shaped defects 401, 402, 403, 404, and 405 which are formed as part of the chemical guiding pattern. The rectangular-shaped defects 401, 402, 403, 404, and 405 comprise rectangular features comprising affinity patterns that are formed of the same material used for the pinning layers, wherein the pinning layers and rectangular-shaped defects 401, 402, 403, 404, and 405 are concurrently formed from the same affinity material using the same mask. With this experiment, the rectangular-shaped defects 401, 402, 403, 404, and 405 are formed to have substantially the same area, but different aspect ratios (H/W) and thus different orientations with respect to the pinning layer pattern, and shown in FIG. 4.

FIG. 4 further illustrates the results of experimental DSA processes that were performed using the same diblock material, at the same annealing temperature, and for the same annealing period, but with different initial thicknesses of the layers of diblock material. In particular, block 410 illustrates DSA patterns formed in the different regions of the test wafer corresponding to block 400, wherein the DSA patterns comprise defects 411, 412, 413, 414, and 415 which are formed as a result of the corresponding rectangular-shaped defects 401, 402, 403, 404, and 405 in block 400. In block 420, the rectangular-shaped defects 421, 422, 423, 424, and 425 comprise regions of the DSA pattern in which a stack of horizontally oriented AB lamellae with pitch Lo are formed planar to the substrate surface (which is in contrast to the non-defective regions of the DSA pattern which include vertically oriented AB lamellae with pitch Lo). The experimental results in block 410 illustrate a relatively small amount of shrinkage in the size of the predefined rectangular-shaped defects 401, 402, 403, 404, and 405 in block 400 when the initial thickness of the diblock layer (prior to annealing) is less than the natural pitch Lo of the constituent block components of the diblock layer (e.g., 0.8 Lo).

Further, block 420 of FIG. 4 illustrates DSA patterns formed in the different regions of the test wafer corresponding to block 400, wherein the DSA patterns comprise defects 421, 422, 423, 424, and 425 which are formed as a result of the corresponding predefined rectangular-shaped defects 401, 402, 403, 404, and 405 in block 400. In block 420, the rectangular-shaped defects 421, 422, 423, 424, and 425 comprise regions of the DSA pattern in which a stack of horizontally oriented AB lamellae with pitch Lo are formed planar to the substrate surface. The experimental results in block 420 illustrate a relatively large amount of shrinkage in the size of the predefined rectangular-shaped defects 401, 402, 403, 404, and 405 in block 400 when the initial thickness of the diblock layer (prior to annealing) is equal to the natural pitch Lo of the constituent block components of the diblock layer.

The experimental DSA processes of FIG. 4 demonstrate that parallel lamella form on the defect regions, while perpendicular lamella form elsewhere. The defects (parallel lamella) usually shrink after the annealing step while converting to perpendicular lamella. In other words, the shrinkage of the programmed defects results from the conversion of parallel lamella to perpendicular lamella morphology during the annealing process. However, the shrinking rate of the defect depends strongly on the BCP film thickness (T) and weakly on aspect ratio of the rectangular-shaped defects. As shown in FIG. 4, the defects in the BCP film of thickness 0.8 Lo hardly shrink while the defects in the 1.0 Lo thick BCP film shrink significantly.

With the experimental results shown in FIG. 4, for a fixed anneal time and fixed temperature, the change in size between the predefined rectangular-shaped defects 401, 402, 403, 404, and 405 and the corresponding DSA defects 411, 412, 413, 414, and 415 in the DSA patterns of block 410 for the BCP film thickness of 0.8 Lo, and the change in size between the predefined rectangular-shaped defects 401, 402, 403, 404, and 405 and the corresponding DSA defects 421, 422, 423, 424, and 425 in the DSA patterns of block 420 for the BCP film thickness of Lo, provides structural information that is used to calibrate physical DSA models. While the experiments shown in FIG. 4 utilize predefined rectangular-shaped defects 401, 402, 403, 404, and 405 with the same area but different aspect ratios and orientations, other types of predefined defects can be formed as part of a guiding pattern to obtain calibration data which is utilized to calibrate physical DSA models, according to an embodiment of the invention, as schematically shown in FIG. 5

Figure 5:
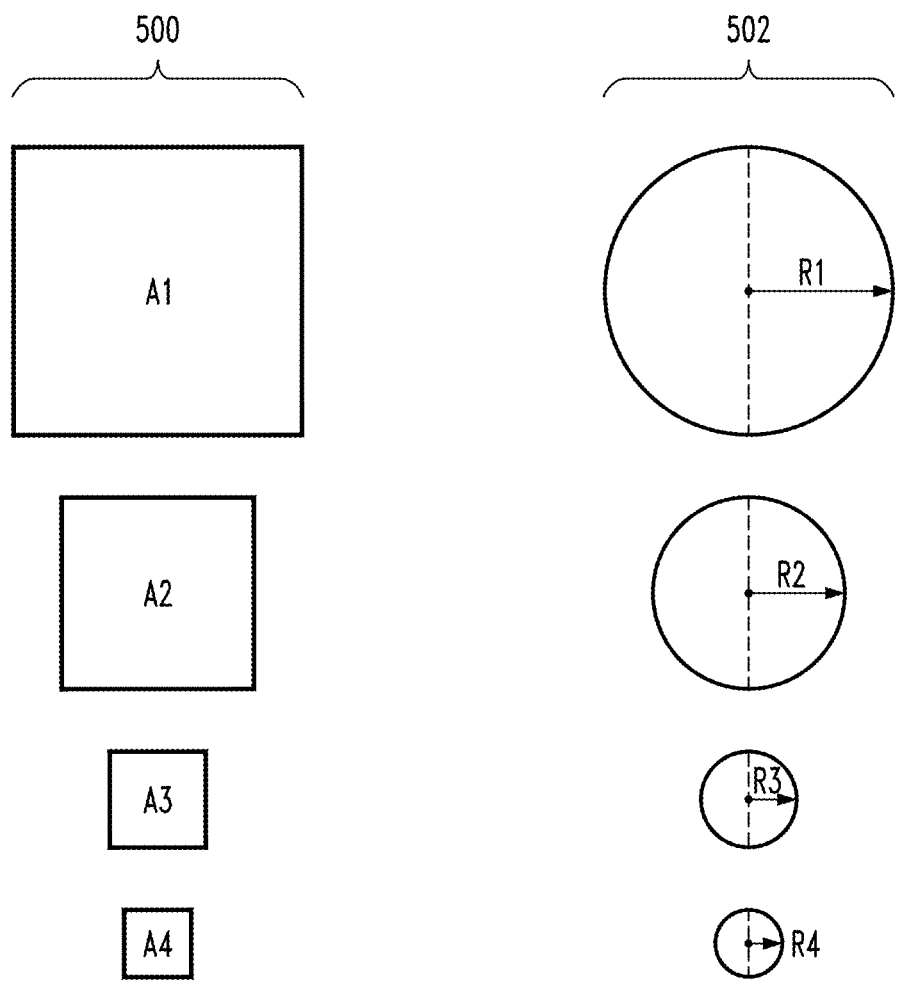
FIG. 5 illustrates other types of predefined defects that can be formed as part of a guiding pattern to obtain calibration data which is utilized to calibrate physical DSA models, according to an embodiment of the invention.

FIG. 5 illustrates other shapes of predefined defects that can be formed as part of a guiding pattern to obtain calibration data which is utilized to calibrate physical DSA models, according to an embodiment of the invention. In particular, as shown in FIG. 5, a chemical guiding pattern can be formed to have a plurality of square-shaped defects 500 having the same aspect ratio, but different areas A1, A2, A3, and A4 and/or circle-shaped defects 502 have different sizes, e.g., different radii R1, R2, R3 and R4. As with the experiments shown in FIG. 4, the various defect shapes 500 and/or 502 can be integrally formed with a guiding pattern, and calibration data can be obtained for a given DSA process by determining a change in the size between the predefined defect shapes 500 and 502 and corresponding DSA defects that remain for a given DSA process (e.g., fixed thermal anneal time, anneal temperature, BCP film thickness, BCP components, etc.). During a DSA process, large defects are more difficult to correct (shrink) than smaller defects under certain process conditions. After a given anneal time and temperature, the different size distributions of the resulting DSA defects provides calibration information that is used to calibrate physical DSA models.

Figure 6:
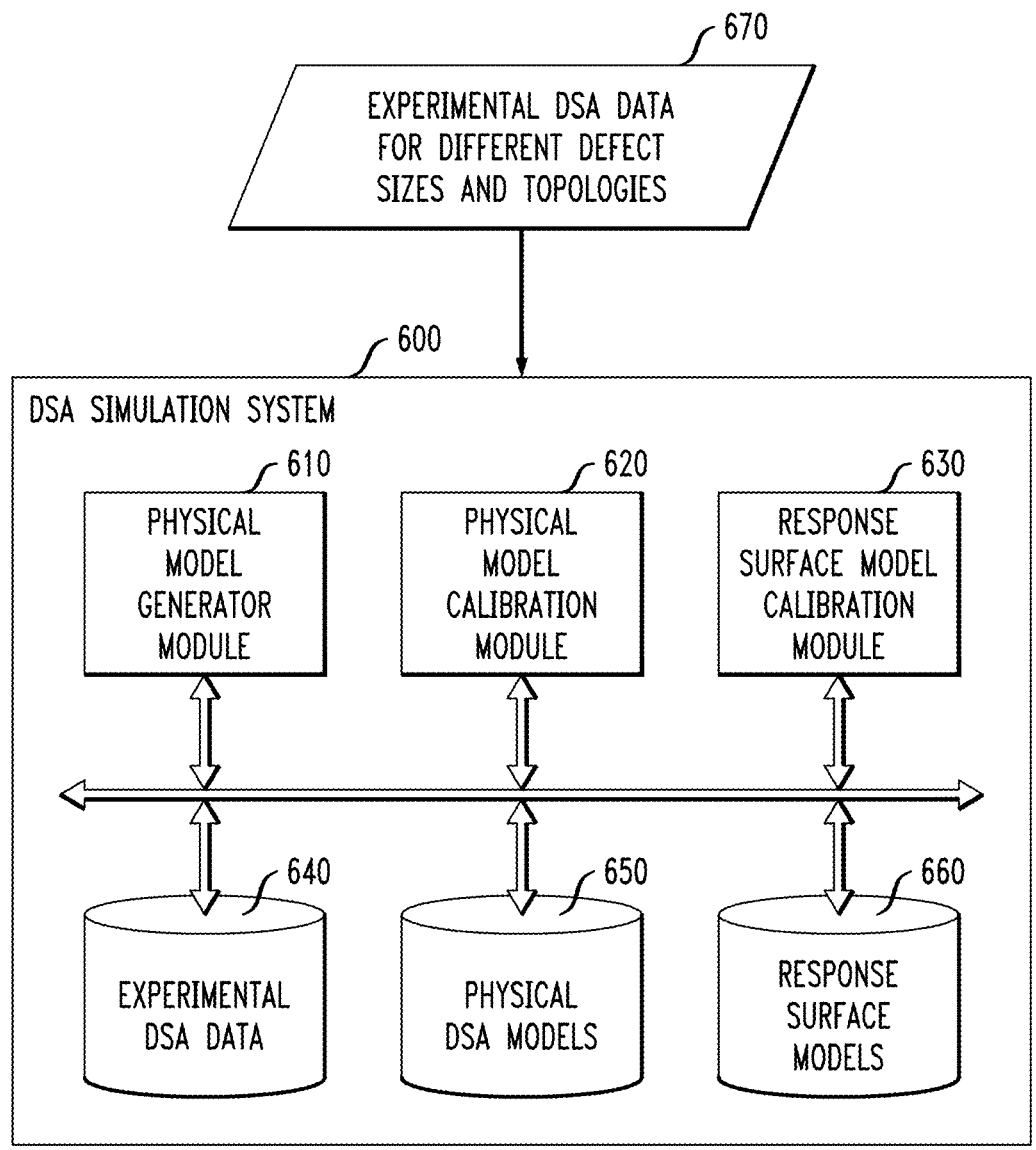
FIG. 6 is a block diagram of a DSA simulation system which is configured to calibrate physical DSA models using calibration data obtained from experimental DSA processes performed using predefined defects formed as part of guiding patterns, according to an embodiment of the invention.

FIG. 6 is a block diagram of a DSA simulation system 600 which is configured to calibrate physical DSA models using calibration data obtained from experimental DSA processes performed using predefined defects formed as part of guiding patterns, according to an embodiment of the invention. The DSA simulation system 600 comprises a plurality of computing modules including physical model generator module 610, a physical model calibration module 620, and a response model generator module 630. The DSA simulation system 600 further comprises one or more databases to store a plurality of data including experimental data 640, physical DSA models 650, and response surface models 660. The DSA simulation system 600 receives as input experimental DSA data 670 with regard to different defect sizes, shapes, topologies of predefined guiding pattern defects, and the resulting sizes of DSA defects, which is used for model calibration. The experimental data 670 is stored in the database 640 of experimental DSA data.

The physical model generator module 610 implements methods that are configured to allow a user to define and generate guiding pattern defects and to define and generate physical DSA models with initial model parameters using a graphical user interface. The physical model calibration module 620 implements direct optimization calibration methods that are configured to enable robust calibration of physical DSA model parameters using the experimental DSA data 640 without the need for time evolution kinetic data as in conventional methods. The physical model calibration module 620 utilizes the programmed DSA defects of varying sizes and topologies (e.g., different aspect ratios, orientations, etc.) in conjunction with the corresponding experimental DSA data to calibrate physical model parameters.

The response surface model generator module 630 implements methods that are configured to generate empirical response surface models for DSA processes, which are used by the physical model calibration module 620 to facilitate model calibration computations and minimize the calibration time. The response surface models are stored in the database of response surface models 660 and utilized during an iterative calibration process speed-up the calibration process, as will be discussed in further detail below.

Figure 7:
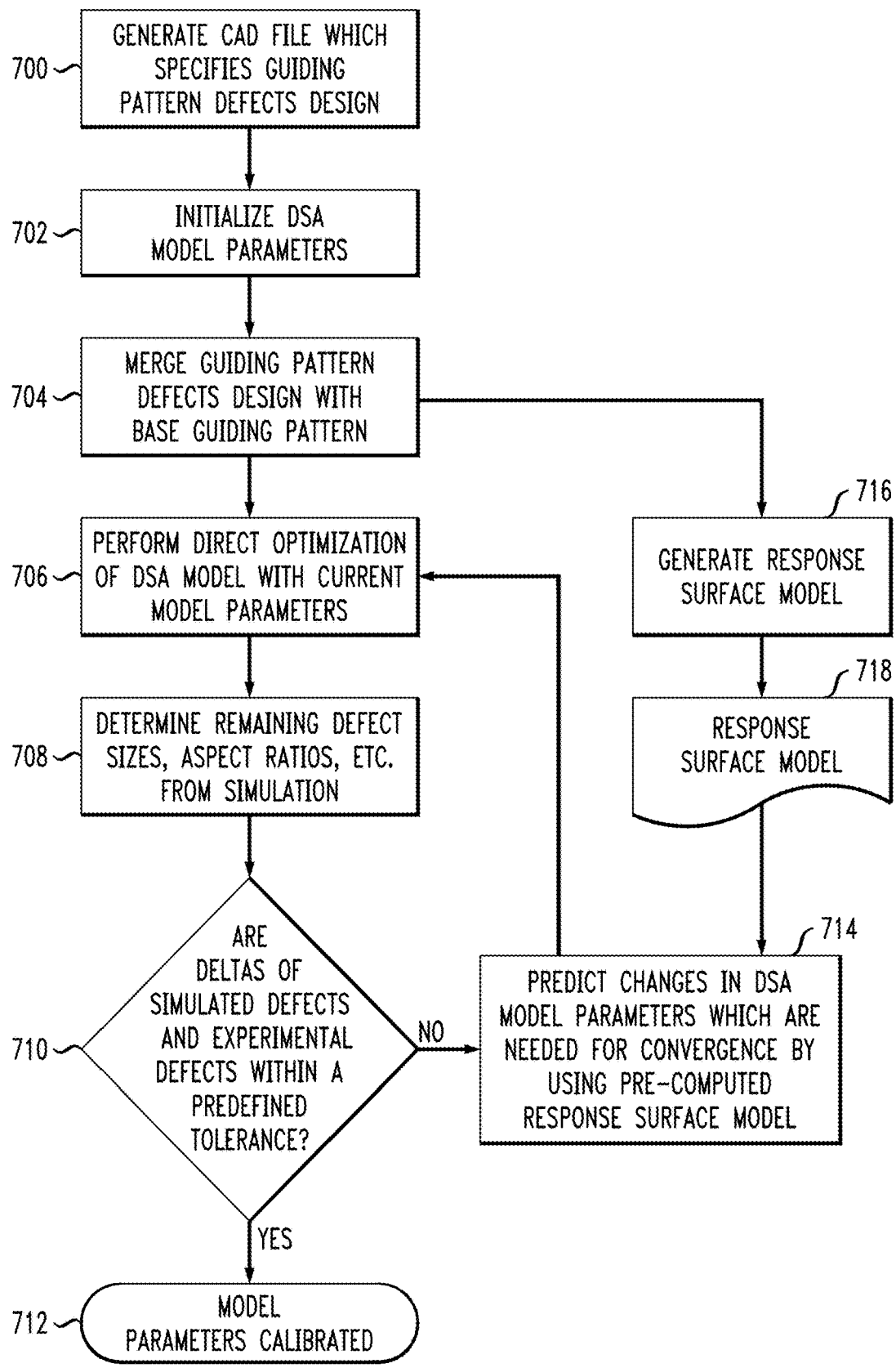
FIG. 7 is a flow diagram of a method for calibrating physical DSA models, according to an embodiment of the invention.

FIG. 7 is a flow diagram of a method for calibrating physical DSA models, according to an embodiment of the invention. The method of FIG. 7 illustrates exemplary operational modes of the DSA simulation system 600 of FIG. 6. As an initial step, a user will generate a computer-aided design (CAD) file that specifies a guiding pattern defects design (block 700). In particular, the CAD file will specify shapes, sizes, orientations, etc., of predefined defects that are to be added to a simulated guiding pattern used for a simulated DSA process. The CAD file can be any suitable type of CAD file format such as text file or a Graphic Data System (GDS) file.

Next, the user will select one or more target physical DSA models (which are maintained in the database of physical DSA models 650) and initialize parameters of the DSA models (block 702). The DSA models are configured to simulate the morphology of block copolymer material formed on chemical and/or physical guiding pattern during a thermal annealing process. The DSA models include various parameters that specify characteristics of various components of a target DSA process including, but not limited to the structural characteristics of a DSA guiding pattern (e.g., chemically and/or physically prepatterned guiding structure), the physical properties the materials used to form the DSA guiding pattern (e.g., affinity values), the physical properties of BCP materials used in the DSA process (e.g., volume fraction of block materials, incompatibility measure between block materials, natural pitch Lo of the block materials, thickness of BCP layer, etc.), DSA process parameters (e.g., anneal time, anneal temperature, etc.).

In one embodiment, the target DSA model comprises a free energy functional which defines a total free energy of the DSA system that is being simulated based on the various model parameters. The total free energy of a DSA system can be defined using any suitable models which takes into consideration various factors including, but not limited to, local volume factions between the block materials (e.g., AB diblock materials), a strength of the micro-phase separation of the constituent BCP materials, the shape and size of the micro-phase separated domains, the surface energy interaction (i.e., affinity) between the BCP materials and the guiding pattern materials, the pitch Ls of the guiding pattern and the natural pitch Lo of the BCP material, and various other factors as is understood by those of ordinary skill in the art.

The free energy functions can be defined using any suitable energy function known in the art. For example, in one embodiment, the free energy functional can be defined as a function of order parameter function $\Psi$ which describes a distribution of a majority and minority species in terms of an order parameter $\Psi$ which ranges from −1 to 1, as follows:

$$\Psi(r;t) = \Phi_A(r) - \Phi_B(r) + (1-2f) = 2(\Phi_A(r)-f),$$

where $\Phi_{A,B}$ denotes local volume fractions of A and B, with $\Phi_A + \Phi_B = 1$ and f is the volume fraction of the A monomer. The free energy function is defined as:

$$F[\Psi(r)] = \int dr \left\{ H(\Psi) + \frac{D}{2} |\nabla \Psi|^2 \right\} +$$

-continued $$\frac{B}{2}\int\int dr\, dr'\, G(r-r')\Psi(r)\Psi(r') - C\int dr\, \exp\left(-\left(\frac{r}{a}\right)^2\right)\left(\frac{\Psi(r)+1}{2}\right)\Psi(r)$$

where:

$$H(\Psi) = \left[-\frac{\tau}{2} + \frac{A}{2}(1-2f)^2\right]\Psi^2 + \frac{v(1-2f)}{3}\Psi^3 + \frac{u}{4}\Psi^4 \text{ and}$$

$$\nabla^2 G(r-r') = -\delta(r-r').$$

In general, each term in the functional, $F[\Psi(r)]$, describes a physical mechanism such as phase separation (i.e., $H(\Psi)$), a surface penalty term for diffusion $$\left(\text{i.e., } \frac{D}{2}|\nabla\Psi|^2\right),$$

long range order interaction term of the self-assembly process $$\left(\text{i.e., } \frac{B}{2}\int\int dr\, dr'\, G(r-r')\Psi(r)\Psi(r')\right),$$

as well as the guiding force imparted by the guiding pattern $$\left(\text{i.e., } C\int dr\, \exp\left(-\left(\frac{r}{a}\right)^2\right)\left(\frac{\Psi(r)+1}{2}\right)\Psi(r)\right),$$

wherein each physical mechanism is defined by multiple parameters that are intrinsic to the given physical mechanism. For example, the parameters for the self-assembly process are τ, A, u, v, D, B. The guiding force field mechanism can include parameters C and a for the guiding force field. The intrinsic self-assembly parameters are related to molecular characteristics, such as degree of polymerization N, segment length b, Flory-Huggins parameter χ, as follows:

$$-\tau + A(1-2f)^2 = \frac{-\left(\chi^N + \frac{s(f)}{4f^2(-f)^2}\right)}{2N}$$

$$D = \frac{b^2}{48f(1-f)} \text{ and } B = \frac{9}{4N^2b^2f^2(1-f)^2},$$

where s(f) is a fitting structure factor in the magnitude of 1.

The rate of change of F is always non-positive which indicates that the thermal equilibrium is reached when F reaches its minimum:

$$\frac{dF}{dt} < 0$$

(free energy decreases with time), where F=min. in an equilibrium state.

To overcome the above-noted challenges of using a temporal model and kinetic time stepping data for DSA modeling, embodiments of the invention perform a direct optimization of the free energy functional. In general, the direct optimization process involves a discretization of Ψ, i.e., determining $\{\Psi_1, \Psi_2, \Psi_3, \ldots, \Psi_n\}$ so that F=min. The optimization can be performed with the initial state being a random distribution of Ψ. Compared to time domain based models, the direct optimization approach provides faster convergence, stability for any meaningful set of parameters, and decreased sensitivity to initial condition, as the direct optimization focuses on equilibrium morphologies rather that temporal behavior (so not temporal output is provided). The direct optimization of the total free energy is generically represented as follows:

$$\min_\Psi F = \frac{F_{tot}}{k_B T} = \int d\vec{r}(F_{mix} + F_{interface} + F_{long} + F_{ext}),$$

where $F_{mix}$ represents the free energy of the phase separation component of the free energy functional, wherein $F_{interface}$ represents the free energy of the diffusion component of the free energy functional, $F_{long}$ represents the free energy of the long range order interaction self-assembly component of the free energy functions, and where $F_{ext}$ represents the free energy of the guiding pattern force component of the free energy functional.

A next step in the simulation process comprises merging the guiding pattern defect designs with the base guiding pattern (block 704). This process results in a computer simulated model of DSA guiding pattern having predefined simulated defects, which corresponds to an experimental DSA guiding pattern with predefined defects that was used to collect physical calibration data. The merged DSA model is then input to the physical model calibration module 620 (FIG. 6) wherein a direct optimization process is performed on the DSA model using the current model parameters (block 706).

In one embodiment, the direction optimization process (in block 706) implements a method to minimize the free energy functional which represents the simulated DSA process. The direct optimization process comprises solving differential equations directly without the use of time domain data that is utilized in time-stepping models of a DSA process (i.e., time evolution data of the DSA process is not considered in the direct optimization process). With this process, the DSA simulation completes when a minimum total free energy of the DSA system is determined by mathematical optimization (i.e., the total free energy of the DSA system is at a minimum at the end of the DSA process). From a thermodynamics perspective, minimization of the total free energy of a DSA system, including the BCP material and boundary conditions provided the guiding pattern and other surroundings, will drive the assembly process.

At the completion of the direct optimization process, the resulting DSA model with the optimized model parameters provides an indication of the phase-separated morphology of the block copolymers of the DSA system based on the guiding pattern with the simulated defects. The physical model calibration module 620 will use the simulation results to determine the sizes, shapes, aspect ratios, topology, etc., of the lamella defects that remain at the completion of the optimization process (block 708). With this step, the physical model calibration module 620 determines the deltas of simulated defects, i.e., the simulated differences in the sizes between the programmed defects of the guiding pattern (defined in block 700 and merged in block 704), and the remaining sizes of the simulated lamella defects of the BCP materials of the simulated DSA process. In addition, the physical model calibration module 620 accesses the database of experimental DSA data 640 to obtain the experimental calibration data generated from an experimental DSA process which corresponds to the simulated DSA process. As noted above, the experimental calibration data provides deltas of actual defects, i.e., the actual differences in the sizes between the predefined defects formed with a guiding pattern and the remaining sizes of the actual lamella defects of the BCP material formed during the experimental DSA process.

The physical model calibration module 620 will compare the simulated defects deltas with the experimental defect deltas (block 710). If the simulated defect deltas and the experimental defect deltas are determined to be the same or similar within a predefined tolerance (affirmative determination in block 710), the calibration process will be deemed complete and the current DSA model parameters will be deemed properly calibrated (block 712). In other words, if the simulation results are the same or similar to the actual experimental results, the simulated model of the DSA process (corresponding to the actual DSA process) will be deemed properly calibrated and sufficiently predictive of the DSA process.

On the other hand, if the simulated defect deltas and the experimental defect deltas are determined to not be the same or similar within a predefined tolerance (negative determination in block 710), another iteration of the direct optimization process of the simulated DSA model will be performed. In particular, the physical model calibration module 620 will predict the changes in one or more parameters of the DSA module that would be needed for convergence of the calibration (block 714). The process flow then returns to block 706 where the direct optimization process is performed on the DSA model with the updated parameters, and the process flow (blocks 706, 708, 710, and 714) is iteratively repeated until the DSA model parameters are deemed to be properly calibrated (block 712).

The prediction process in block 714 can be implemented using any suitable method. In one embodiment, the physical model calibration module 620 will predict the DSA model parameter changes using a precomputed response surface model. In particular, as an optional step, the merged DSA model (generated in block 704) can be processed (block 716) by the response surface model generator module 630 to generate a response surface model (block 718) which can be used in the calibration process.

As in known in the art, response surface modeling is based on a collection of mathematical and statistical techniques for empirical model building. The response surface model is utilized to optimize a given response (output variable) which is influenced by a plurality of independent variables (input variables). In one exemplary embodiment, the response surface model comprises an empirical model which provides a plurality of pre-calculated tables of system energy based on the various parameters of the physical DSA model. For example, for an n-parameter DSA model, each parameter can be divided into a set of multiple values (e.g., 100 different step values) between a zero (0) and a maximum value. The empirical surface response model can be used to compute the total system energy for various combinations of the parameter values, wherein the computed system energies are stored in data structures and mapped to the set of parameter values.

During the DSA model calibration process, the physical model calibration module 620 can access the response surface model which corresponds to the physical DSA model being calibrated, and utilize the precomputed system energy values and corresponding parameter values provided by the surface response model, to determine changes in the values of one or more of the current DSA model parameters which may result in convergence of the calibration of the physical DSA model.

Embodiments of the invention include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the invention are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (e.g., FIGS. 6 and 7) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 8, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 8:
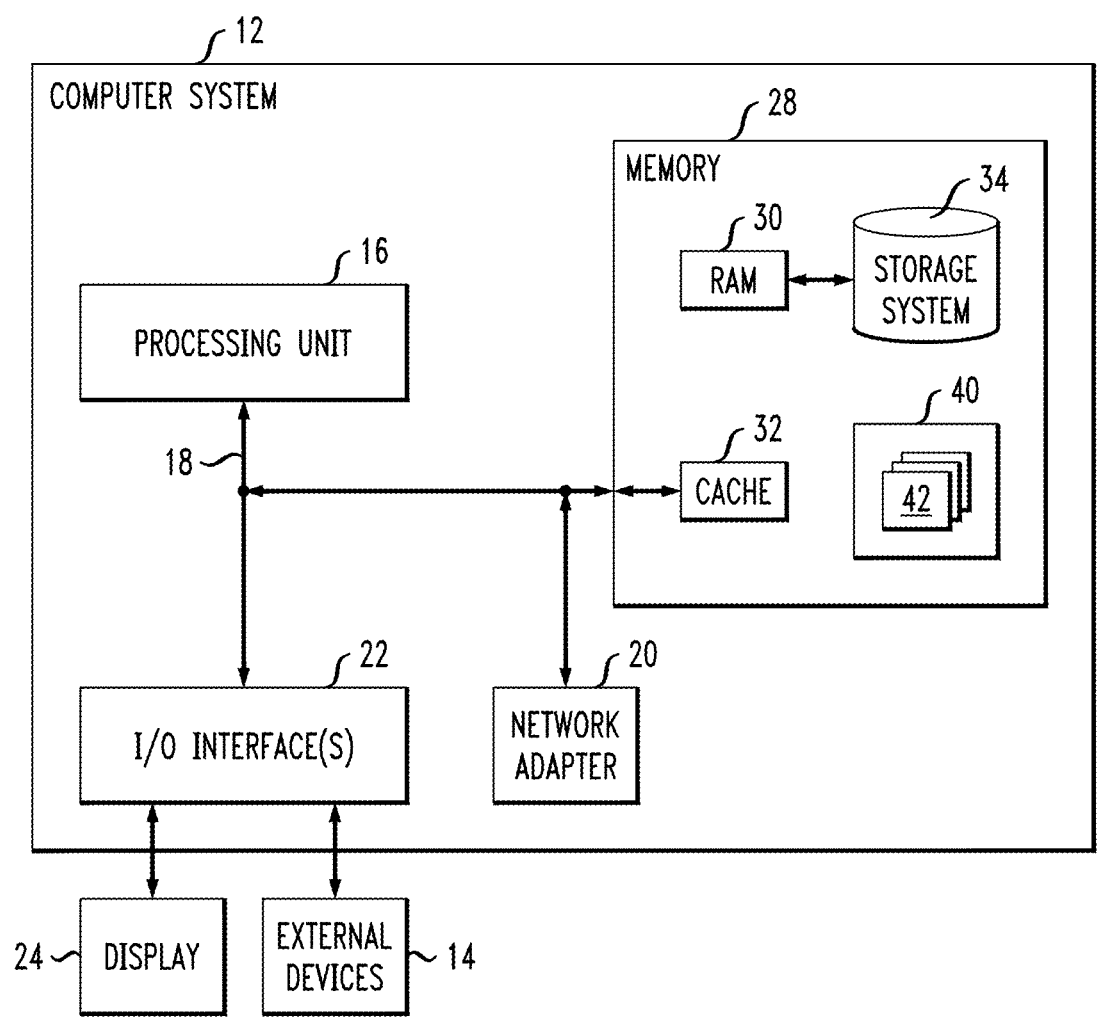
FIG. 8 is a system diagram of an exemplary computer system on which at least one embodiment of the invention can be implemented.

In FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Although exemplary embodiments have been described herein with reference to the accompanying figures, it is to be understood that the invention is not limited to those precise embodiments, and that various other changes and modifications may be made therein by one skilled in the art without departing from the scope of the appended claims.

I claim:

1. A computer simulated method, the method comprising:
   receiving as input, calibration data from an experimental directed self-assembly (DSA) process which is performed using a block copolymer (BCP) material and a DSA guiding pattern with a predefined defect formed as part of the DSA guiding pattern, wherein the calibration data comprises information regarding an experimental difference in size between the pre-defined defect of the DSA guiding pattern, and a remaining size of a morphological defect in the BCP material as assembled at a completion of the experimental DSA process;
   generating a simulated physical DSA model with initial model parameters, wherein the simulated physical DSA model defines a simulated DSA process which corresponds to the experimental DSA process, and wherein the simulated physical DSA model comprises a simulated guiding pattern with a programmed defect, which corresponds to the DSA guiding pattern and the pre-defined defect;
   performing an optimization process of the simulated physical DSA model using the initial model parameters;
   determining a simulated difference in size between the programmed defect of the simulated guiding pattern and a remaining size of a simulated morphological defect which results from the optimization process of the simulated physical DSA model;
   comparing the experimental difference in size and the simulated difference in size to determine a comparison value; and
   determining that the simulated physical DSA model is calibrated in response to the comparison value being within a predefined tolerance threshold.

2. The method of claim 1, further comprising:
   determining that the simulated physical DSA model is not calibrated in response to the comparison value not being within the predefined tolerance threshold;
   updating the simulated physical DSA model by changing at least one parameter of the simulated physical DSA model; and
   repeating the optimization process using the updated simulated physical DSA model.

3. The method of claim 2, wherein the updating of the simulated physical DSA model comprises:
   obtaining an empirical model that corresponds to the simulated physical DSA model; and
   determining a new value for at least one parameter of the simulated physical DSA model based on the empirical model.

4. The method of claim 3, wherein the empirical model comprises a response surface model.

5. The method of claim 1, wherein the DSA guiding pattern and the corresponding simulated guiding pattern comprise a chemical guiding pattern with pinning regions and neutral regions, wherein the predefined defect and the corresponding programmed defect comprise pinning regions in the DSA and simulated guiding patterns.

6. The method of claim 1, wherein the predefined defect and the corresponding programmed defect comprise a plurality of rectangular-shaped defects with a same area but different aspect ratios.

7. The method of claim 1, wherein the predefined defect and the corresponding programmed defect comprise a plurality of circular-shaped defects with different radii.

8. The method of claim 1, wherein the predefined defect and the corresponding programmed defect comprise a plurality of square-shaped defects with different areas.

9. An article of manufacture comprising a non-transitory computer readable storage medium having program instructions embodied therewith, wherein the program instructions are executable by a computer to perform a method comprising:
   receiving as input, calibration data from an experimental directed self-assembly (DSA) process which is performed using a block copolymer (BCP) material and a DSA guiding pattern with a predefined defect formed as part of the DSA guiding pattern, wherein the calibration data comprises information regarding an experimental difference in size between the pre-defined defect of the DSA guiding pattern, and a remaining size of a morphological defect in the BCP material as assembled at a completion of the experimental DSA process;
   generating a simulated physical DSA model with initial model parameters, wherein the simulated physical DSA model defines a simulated DSA process which corresponds to the experimental DSA process, and wherein the simulated physical DSA model comprises a simulated guiding pattern with a programmed defect, which corresponds to the DSA guiding pattern and the pre-defined defect;

performing an optimization process of the simulated physical DSA model using the initial model parameters;

determining a simulated difference in size between the programmed defect of the simulated guiding pattern and a remaining size of a simulated morphological defect which results from the optimization process of the simulated physical DSA model;

comparing the experimental difference in size and the simulated difference in size to determine a comparison value; and determining that the simulated physical DSA model is calibrated in response to the comparison value being within a predefined tolerance threshold.

10. The article of manufacture of claim 9, wherein the program instructions are further executable for:

determining that the simulated physical DSA model is not calibrated in response to the comparison value not being within the predefined tolerance threshold;

updating the simulated physical DSA model by changing at least one parameter of the simulated physical DSA model; and repeating the optimization process using the updated simulated physical DSA model.

11. The article of manufacture of claim 10, wherein the updating of the simulated physical DSA model comprises:

obtaining an empirical model that corresponds to the simulated physical DSA model; and determining a new value for at least one parameter of the simulated physical DSA model based on the empirical model.

12. The article of manufacture of claim 11, wherein the empirical model comprises a response surface model.

13. The article of manufacture of claim 9, wherein the DSA guiding pattern and the corresponding simulated guiding pattern comprise a chemical guiding pattern with pinning regions and neutral regions, wherein the predefined defect and the corresponding programmed defect comprise pinning regions in the DSA and simulated guiding patterns.

14. The article of manufacture of claim 9, wherein the predefined defect and the corresponding programmed defect comprise a plurality of rectangular-shaped defects with a same area but different aspect ratios.

15. The article of manufacture of claim 9, wherein the predefined defect and the corresponding programmed defect comprise a plurality of circular-shaped defects with different radii.

16. The article of manufacture of claim 9, wherein the predefined defect and the corresponding programmed defect comprise a plurality of square-shaped defects with different areas.

17. An apparatus comprising:
at least one processor; and
a memory to store program code that is executable by the at least one processor to implement a process comprising:
receiving as input, calibration data from an experimental directed self-assembly (DSA) process which is performed using a block copolymer (BCP) material and a DSA guiding pattern with a predefined defect formed as part of the DSA guiding pattern, wherein the calibration data comprises information regarding an experimental difference in size between the pre-defined defect of the DSA guiding pattern, and a remaining size of a morphological defect in the BCP material as assembled at a completion of the experimental DSA process;

generating a simulated physical DSA model with initial model parameters, wherein the simulated physical DSA model defines a simulated DSA process which corresponds to the experimental DSA process, and wherein the simulated physical DSA model comprises a simulated guiding pattern with a programmed defect, which corresponds to the DSA guiding pattern and the pre-defined defect;

performing an optimization process of the simulated physical DSA model using the initial model parameters;

determining a simulated difference in size between the programmed defect of the simulated guiding pattern and a remaining size of a simulated morphological defect which results from the optimization process of the simulated physical DSA model;

comparing the experimental difference in size and the simulated difference in size to determine a comparison value; and determining that the simulated physical DSA model is calibrated in response to the comparison value being within a predefined tolerance threshold.

18. A method comprising:
performing an experimental directed self-assembly (DSA) process using a block copolymer (BCP) material and a DSA guiding pattern with a predefined defect formed as part of the DSA guiding pattern;

determining an experimental difference in size between the predefined defect of the DSA guiding pattern, and a remaining size of a morphological defect in the BCP material as assembled at a completion of the experimental DSA process; and utilizing the experimental difference in size as calibration data in a DSA simulation system to calibrate a simulated physical DSA model which defines a simulated DSA process that corresponds to the experimental DSA process, wherein the simulated physical DSA model comprises a simulated guiding pattern with a programmed defect, which corresponds to the DSA guiding pattern and the predefined defect.

19. The method of claim 18, wherein the DSA guiding pattern and the corresponding simulated guiding pattern comprise a chemical guiding pattern with pinning regions and neutral regions, wherein the predefined defect and the corresponding programmed defect comprise pinning regions in the DSA and simulated guiding patterns.

20. The method of claim 18, wherein the predefined defect and the corresponding programmed defect comprise a plurality of rectangular-shaped defects with a same area but different aspect ratios.

21. The method of claim 18, wherein the predefined defect and the corresponding programmed defect comprise a plurality of circular-shaped defects with different radii.

22. The method of claim 18, wherein the predefined defect and the corresponding programmed defect comprise a plurality of square-shaped defects with different areas.

* * * * *